Feb. 15, 1966   G. A. DIEHL   3,235,106
LIFTER TRANSPORT VEHICLE
Filed Nov. 18, 1963   6 Sheets-Sheet 3
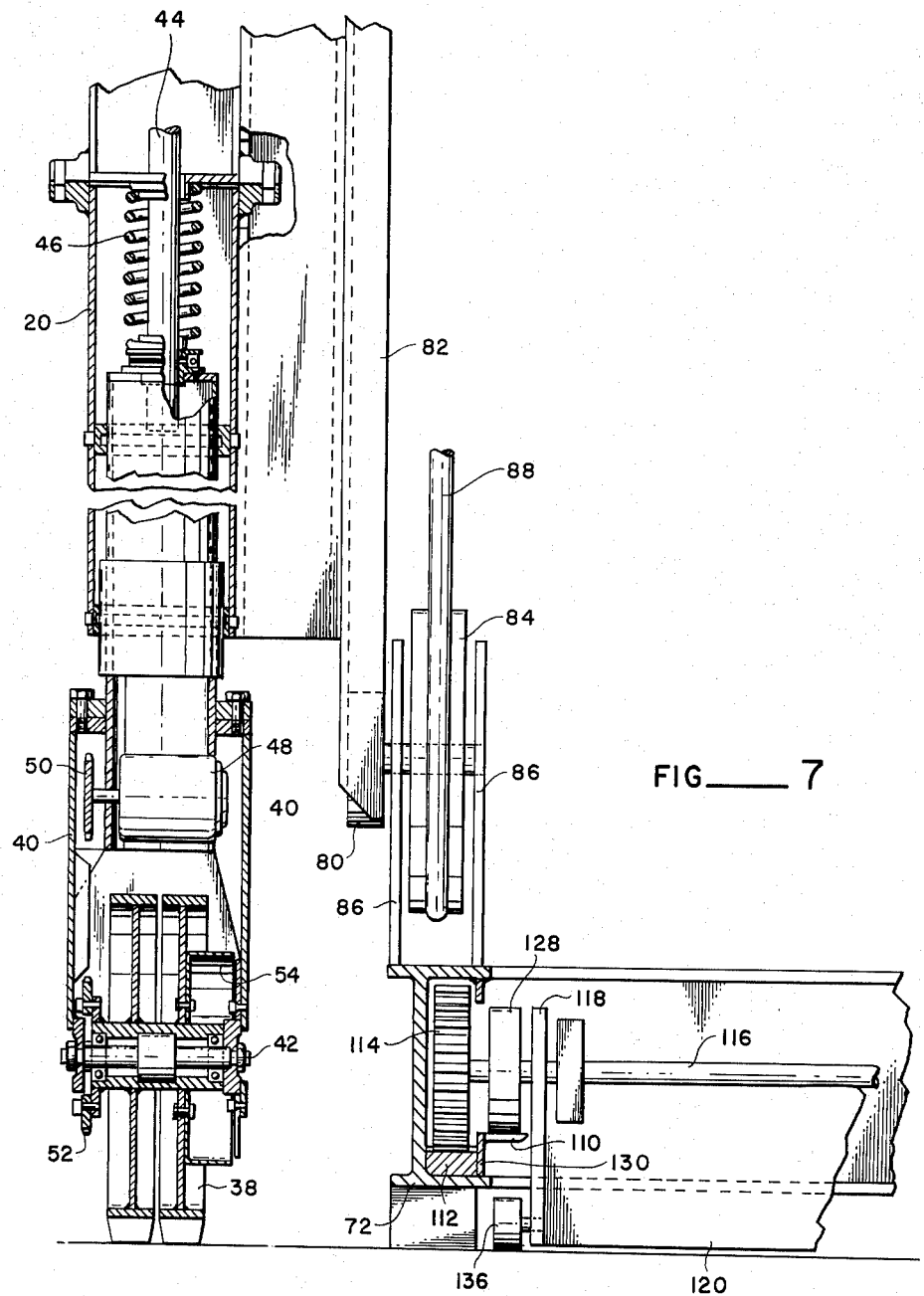
FIG___7
GLENN A. DIEHL
INVENTOR.
BY *Tuck & Cole*
ATTORNEYS Feb. 15, 1966 G. A. DIEHL 3,235,106
LIFTER TRANSPORT VEHICLE
Filed Nov. 18, 1963 6 Sheets-Sheet 4
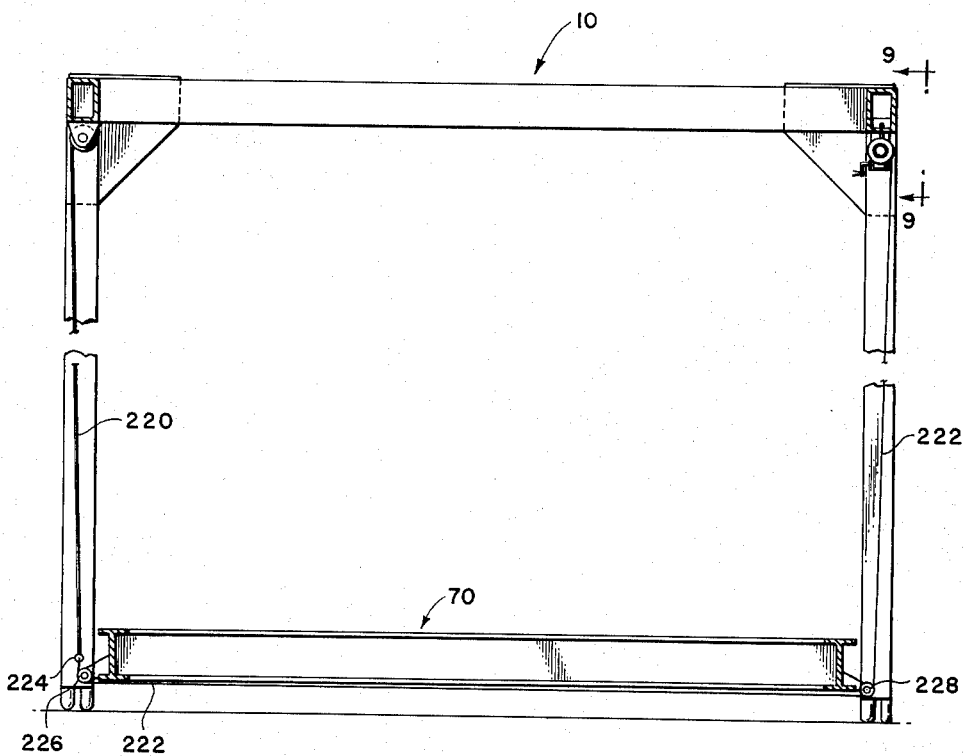
FIG—8
INVENTOR.
GLENN A. DIEHL
BY Tuck & Cole
ATTORNEYS Feb. 15, 1966  G. A. DIEHL  3,235,106
LIFTER TRANSPORT VEHICLE
Filed Nov. 18, 1963  6 Sheets-Sheet 5
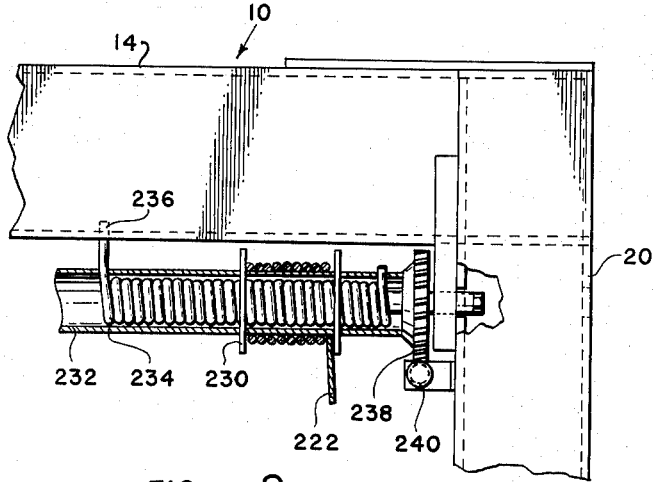
FIG__9
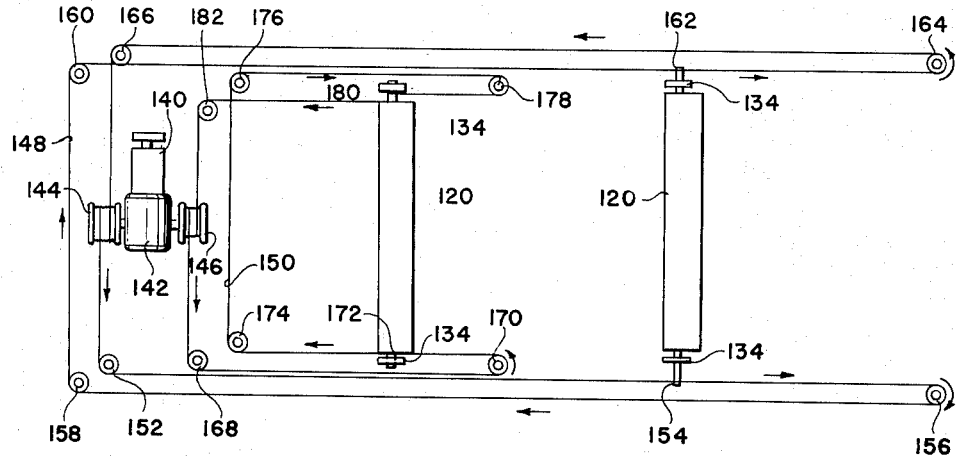
FIG__10
GLENN A. DIEHL
INVENTOR.
BY Tuck & Cole
ATTORNEYS Feb. 15, 1966
G. A. DIEHL
3,235,106
LIFTER TRANSPORT VEHICLE
Filed Nov. 18, 1963
6 Sheets-Sheet 6
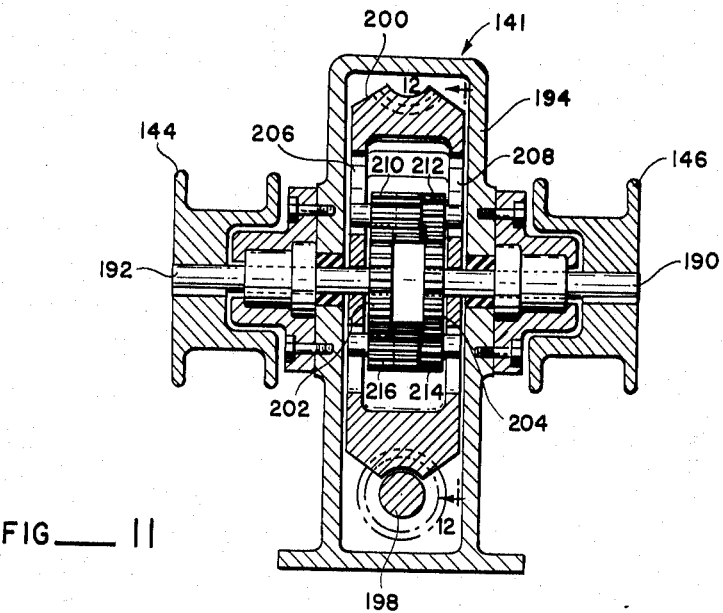
FIG.__11
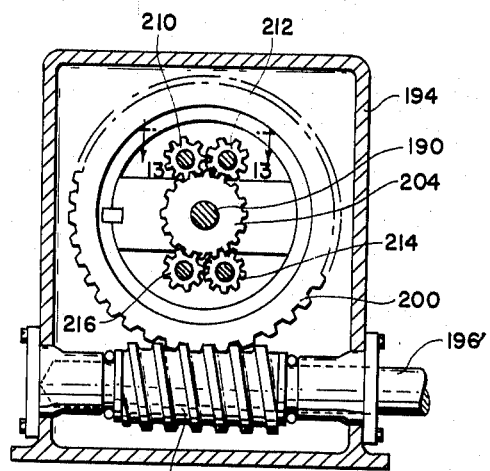
FIG.__12
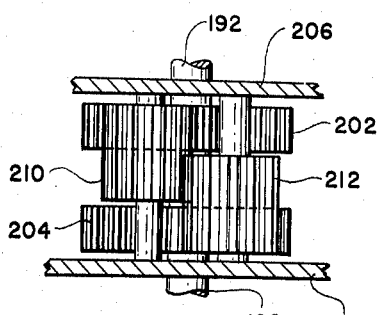
FIG.__13
GLENN A. DIEHL
INVENTOR.
BY *Tuck & Cole*
ATTORNEYS United States Patent Office 3,235,106
Patented Feb. 15, 1966

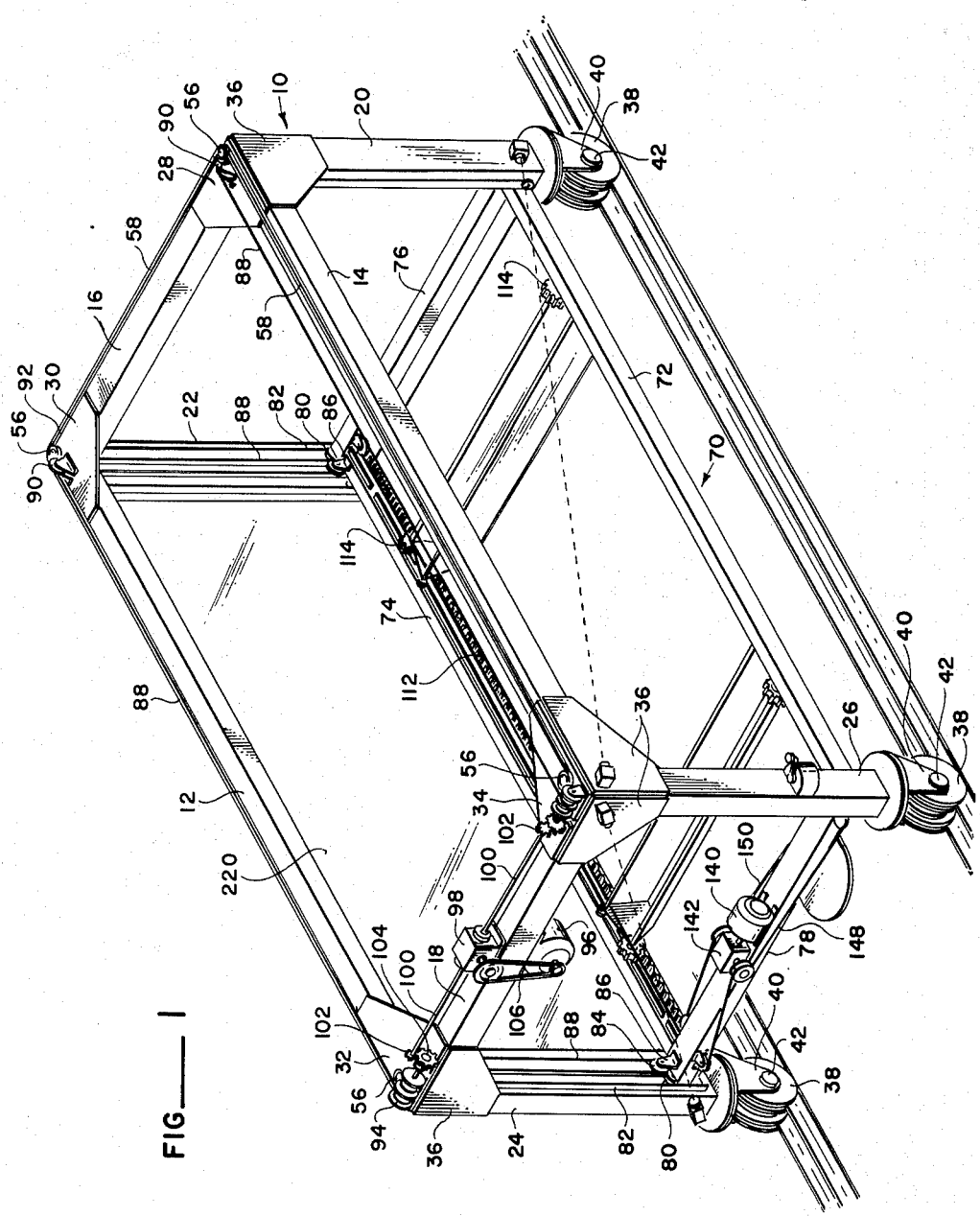

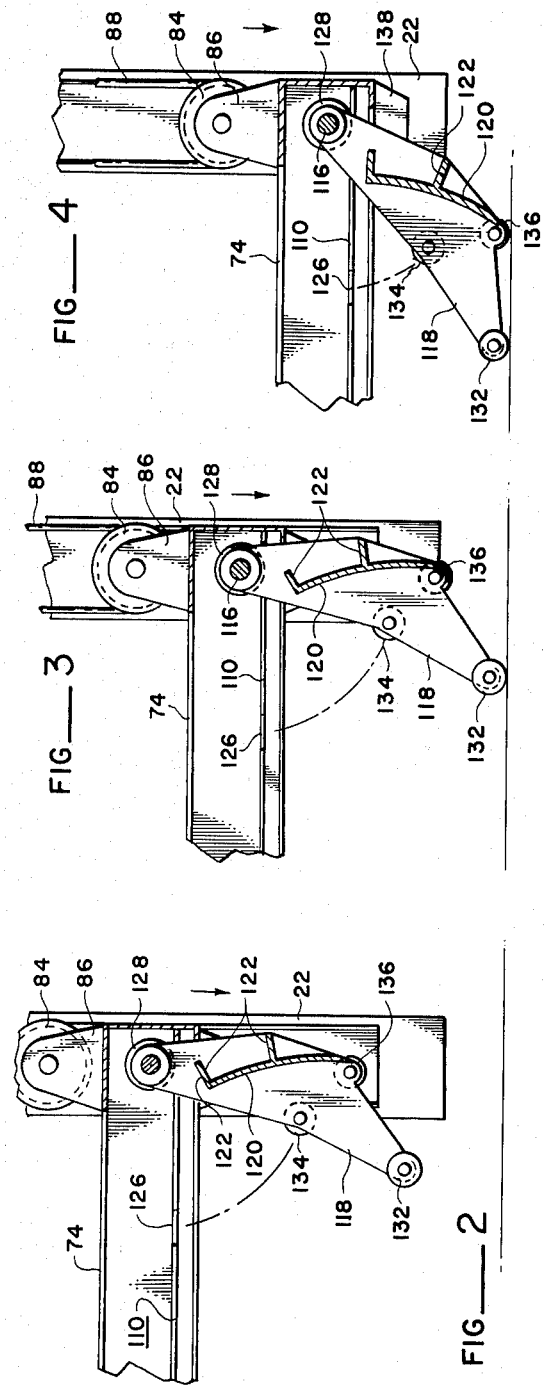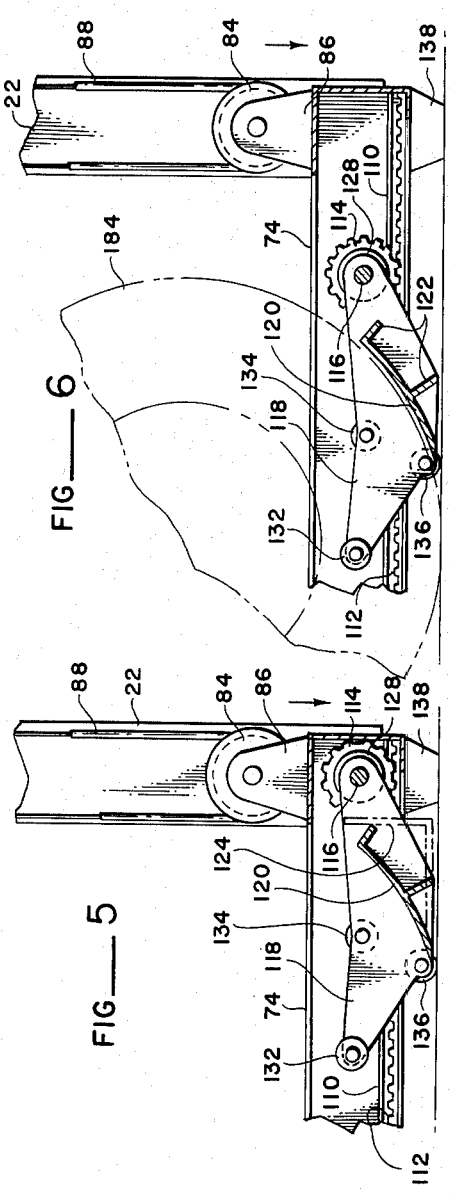

3,235,106
LIFTER TRANSPORT VEHICLE
Glenn A. Diehl, 3639 45th SW., Seattle, Wash.
Filed Nov. 18, 1963, Ser. No. 324,325
16 Claims. (Cl. 214—333)

This invention relates to a new and useful concept in a lifter transport vehicle which may be used to store and transport objects including automobiles, boxes, crated materials or other items of any size or shape. More specifically, this invention relates to a lifting and transporting device which, because of its ability to straddle stored objects and to lift its loads above the stored objects, permits efficient utilization of available space for storage.

One of the basic problems confronting the owners of building and warehouses used primarily for storage purposes is the efficient utilization of available floor area. A conventional way, for instance, of parking vehicles is to leave enough room for the automobile to be driven to the stall. Such parking necessitates provision of a considerable amount of driveway area in addition to keeping the individual parking stalls large enough so that either the attendant or the vehicle operator may conveniently store the vehicle and yet get in and out of the car.

In like manner, warehouses and sheds and other storage places must provide wide aisles for presently known equipment to pass between the stacks or piles of stored material. Such aisles and roadways mean that valuable square footage is not being profitably used. The problem of effectively utilizing the maximum amount of available square footage is one which presently known equipment does not solve since forklifts and other materials-handling devices require room in which to maneuver.

The lifter transport vehicle of this invention is specifically designed to permit the maximum usage of available floor space. In essence, this invention provides a vehicle with a main, rectangularly shaped, supporting frame mounted on legs whereby loads can be picked up and lifted freely up through the main frame. This main frame is supported on suitably long legs which are equipped with traction wheel assemblies. The vehicle is further equipped with a lifting frame whereby cargoes can be lifted up through the main frame and transported over the tops of other objects by the simple principle of the vehicle's straddling such other objects. It will be apparent that narrow aisles must be allowed for the legs of this vehicle to travel in when depositing or picking up loads. Such aisles, however, would be much narrower than those required for conventional materials-handling devices, hoists, or forklifts.

This lifter transport vehicle, in addition to its main and lifting frames, has drive means for its traction wheels in addition to steering means and includes a novel load-engaging feature which may be retracted from under the load and which feature operates in conjunction with the lifting frame. The lifter transport vehicle is adaptable so that it may be operated by an operator at a control station on the vehicle, or it may be controlled entirely automatically from a remote control point.

Accordingly, it is an object of this invention to provide a lifter transport vehicle which is simple in design, rugged in construction and economical to produce.

Another feature of this invention is to provide a lifter transport vehicle that is versatile, able to travel in all directions and generally serve any amount of given storage area at comparatively low cost.

Still another object of this invention is to furnish a lifter transport vehicle which permits a load to be picked up and lifted through the frame and transported over other objects.

Yet another object of this invention is to supply a lifter transport vehicle requiring only enough floor space in the form of narrow aisles to permit its vertical components or legs to pass through said aisle.

Other objects and advantages of the invention will become apparent in the subsequent detailed disclosure and appended claims. Also forming a part of this disclosure are the accompanying drawings, wherein like numbers refer to like parts throughout, and in which:

FIGURE 1 is a view in perspective of this invention indicating generally the arrangement in perspective of the inter-relationship of the various parts, sections and components;

FIGURES 2 through 6 show details of the novel load-engaging mechanism and which illustrate the sequence of steps through which said novel load-engaging mechanism engages the object and is retracted therefrom;

FIGURE 7 is a partial and elevational view in cross-section showing a typical leg structure and further details of the load lifting mechanism;

FIGURE 8 is an end view in cross section showing more diagrammatically and in detail the general arrangement of the protective curtain which automatically stretches across the bottom of the lifting frame when it is raised;

FIGURE 9 shows further detail of the spring mechanism used for winding up the cable or cord of the protective curtain as the lifter frame is raised;

FIGURE 10 is a diagrammatic, or schematic, illustration of the cable control mechanism for the load engaging devices mounted on the lifter frames;

FIGURE 11 is an end view of the driving mechanism for the load-engaging apparatus on the lifter frame with the housing sectioned away to show details of gearing;

FIGURE 12 is a side elevational view of the differential mechanism shown in FIGURE 11 taken along the line 12—12 of said FIGURE 11; and FIGURE 13 is a top plan view in section and partial only taken along the line 13—13 of FIGURE 12 showing further details of said differential mechanism.

*Main frame*

Referring now to the drawings and particularly FIGURE 1 it will be seen that the main frame generally designated by the number 10 is composed of longitudinal frame members 12 and 14 and the end or cross members 16 and 18. Depending from each of the corners of this rectangular structure are the generally vertical legs 20, 22, 24 and 26. The longitudinal and cross members are strengthened by gusset plates 28, 30, 32 and 34 and the legs are held rigidly by generally vertical gusset plates 36, of which there are two for each leg. The legs may be of any length, depending upon the particular use to which the lifter transport vehicle is to be used. The frame members, including the legs may be of any desirable cross-sectional construction, although it is believed that the box beam construction is preferable. At the lower end of each of the legs will be found the traction wheel asembly generally designated by the number 38 which will be described in greater detail hereinafter. All of the traction wheels 38 are pivotable in a complete 360 degrees circle and are interconnected so that they are turnable together in whatever direction is desired.

Each of the wheels 38 has a swivel yoke mechanism 40 and an axle 42. Each of the legs 20, 22, 24 and 26 has extending down through the center thereof from the top of the frame to the wheel structure a control shaft 44 (see FIGURE 7) so that turning control of the wheels may be accomplished. As will be seen by reference to FIGURE 7, the lower end of the leg structure will be of the telescopic type to provide a shock absorbing feature in each of the wheels. Thus, generally described, the wheel will have the shock absorbing compression spring 46 inside the leg housing 20. Below the shock each leg will have its individual drive motor 48 which may be either electrical, hydraulic or mechanical, depending upon the type of main hoist motor which is used in the lifter transport vehicle. The motor 48 will drive sprocket 50 which in turn in chain connected to sprocket 52 or other suitable drive components attached to the wheel axle 42. It will be seen that in this way each wheel will be independently driven. In addition, each wheel will have the brake assembly 54 connected thereto. It is to be understood that the traction wheel assemblies 38 may use single or dual wheels which may be equipped with solid or pneumatic tires for negotiating roadways or even for off-highway operation. They may also be grooved or flanged for use on fixed rails of suitable shape. As mentioned above, steering action of the wheel asesmblies may be full circle, if necessary and if desired. Simultaneous or synchronized steering control of all of the wheel assemblies is provide at the upper end of the control shafts 44.

Note especially in FIGURE 1 that at the top end of each of the wheel control shafts 44 there is a control pulley 56 and a steering cable 58. The steering cable 58 may be a roller chain or other equivalent means. The precise mechanism for moving the steering chain or cable 58 is not shown for the purpose of eliminating those details which could be supplied by a person skilled in the art and which are not essential to an understanding of the invention.

It will be appreciated that all four travel trucks or wheel assemblies will turn simultaneously to permit lateral or longitudinal movement of the main frame and if necessary will even permit the lifter transport vehicle to be crabbed at an angle.

*Lifter frame*

The lifter frame generally designated by the number 70 is comprised of two longitudinal members 72 and 74 and end members 76 and 78. It will be seen that the lifter frame or sub-frame assembly is movably mounted within the confines of the main frame between the legs. The main support members of the sub-frame 70 are most advantageously I-beams or channels since it is necessary that gear racks be installed in the opposed longitudinal members on the lower flange of the beam. It will be noted that a guide roller 80 is attached at each corner of the lifter frame at the ends of the two end members 76 and 78. The guide rollers 80 are confined within the generally vertical guides 82 attached to the inside of each leg and extending from the bottom to the top thereof. Note that the guide rollers 80 extend outwardly from the side surfaces of the longitudinal members.

However, located at each of the four corners on the upper surface of the lifter frame will be found lifter frame pulleys 84 securely mounted on brackets 86. Hoisting cable 88 is reeved through the underside of the frame pulley 84 and anchored or dead-ended at the top of the main frame, most appropriately on the gusset plates at the upper corners. The cable then extends down under pulley 84 and back up to the hoisting pulley 90 mounted in brackets 92. The hoisting cable pulley 90 and brackets 92 are at the end of the main frame away from the hoisting motor and mechanism. The hoisting cable 88 is then extended over the top of the hoisting pulleys 90 and extends along the length of the top longitudinal members 12 and 14 to the outside section of the double drum assembly 94 at the motor end of the main frame. The inner section of the double drum 94 also contains or includes a hoisting cable 88 anchored at the top of the main frame extending down under the lifter frame pulley 84 and back up and through the inside section of the double drum 94. Thus, all four corners of the lifter frame are supported by a double run of cable reeved under stationary pulleys attached to the lifter frame.

The lifter frame is raised and lowered by virtue of a main hoist motor 96 which has an appropriate braking mechanism (not shown) and which motor in turn drives an appropriate gearing mechanism 98 on the top of the cross member 18 of the main frame. Shafts 100 extend out from the gearing mechanism towards the double drum assemblies and terminate with pinion gears 102. Pinions 102 in turn drive gears 104 appropriately connected by shafts to the double drum assemblies 94. In this way, raising and lowering of the lifter frame is synchronized and made extremely simple. While those skilled in the art will readily conceive the various ways of lifting the lifter frame, the mechanism herein shown has been set forth because of its simplicity and because it is well known and understood. Motor 96 is connected by appropriate belt or chain means 106 which runs from the motor to input pulley of the gearing mechanism.

*Load engaging and lifting mechanism*

The inner lower flange of each of the longitudinal members 72 and 74 of the lifter frame are provided with rails 110 and positive drive trackage or rack 112. The rack 112 is of sufficient length, extending from the extreme ends of each of the longitudinal members inwardly towards the center or midpoint of the longitudinal member so that the load-engaging end-lifting scoops may be advanced far enough from the end to engage the kind of loads which the particular lifter transport vehicle will be lifting. It will be noted, with reference to FIGURES 1 through 7, that the load-engaging and lifting mechanism is singularly unique. It will be noted, particularly by reference to FIGURE 7, that the rack 112 is outboard of the rail 110. The traction wheels or pinions 114 ride on the racks 112. The axes of said pinions 114 are coaxial and the two pinions are interconnected by scoop shaft 116 which extends from one longitudinal frame member to the other.

Pivotally attached to shaft 116 in close proximity to the rail 110 is an end or cheek plate 118. Extending between each of the end plates 118 is the elongated and slightly curved scoop plate 120. For purposes of illustration the scoop plate 120 is shown to be strengthened by rib members 122. Thus, basically is the scoop mechanism formed. Scoop plate 120 is shown to be curved merely to indicate that it can be used for lifting automobiles. FIGURE 5 indicates in dash-dot lines 124 that the scoop or load engaging means may be of different shape in order more effectively to operate with boxes and crates and the like.

The rail 110 is provided with an opening 126 for a purpose now to be described. When the lifter frame is in its upper position, the scoops 120 with their end plates 118 will hang generally vertically from roller 128 which at all times rides on and is supported by said rail 110. The rail 110 can, as shown in FIGURE 7, be an angle member 130, rigidly secured to the lower flange of the beam 72. Each end plate 118 has on the outermost end thereof the roller 132 and on the upper edge thereof approximately midway between rollers 128 and 132 the intermediate upper roller 134. Each end plate is also provided with a lower intermediate roller 136, the axis of which is approximately located at the bottom edge of scoop 120. As lifting frame 70 is lowered, roller 132 contacts the floor as shown in FIGURE 3. It will be noted that roller 132 at the outer tip of the end plate is generally vertically offset with respect to the main supporting roller 128, thereby creating a moment arm to cause the scoop 120 to move in an arc about shaft 116. Roller 134 acts as the center as the frame 70 continues to descend. By following FIGURES 3 through 6, it will be seen that the scoop begins to swing upwardly as roller 132 engages the floor and the frame 70 continues to descend. When both rollers 132 and 136 are touching the floor as shown in FIGURE 4, the moment arm is transferred to roller 136. Further lowering of the frame causes roller 136 to continue to swing scoop 120 about its pivot center so that when the frame is completely lowered the upper intermediate roller 134 has passed through the notch 126 to allow said roller 134 to be aligned with track or rail 110.

In the full down position frame 70 is at rest on blocks 138 provided on the underside of the four corners of the lifter frame. The load to be lifted is now fully surrounded by the frame and the load engaging means now in a position to be moved into contact with the load by cables attached to the scoops, as will be more fully hereinafter described. When upper intermediate roller 134 passes upwardly beyond notch 126 the scoops cannot swing about their main shaft 116 and main supporting roller 128. Roller 134 is then supported by the track 110 and along with main support roller 128 will function as the primary load supporting means for the scoop.

As mentioned above, the racks 112 are of sufficient length to permit the pick-up scoops or ringers 120 to move to and engage the load. Each of said scoops is driven forward or backward by scoop drive motor 140 through self-locking differential gear drive 142. The gear drive 142 in turn is provided with opposed cable drums 144 and 146. Cable drum 144 drives the front scoop 120 by virtue of the cable 148 while the other drum drives rear scoop by cable 150. It will be seen by reference to FIGURE 10 that front scoop cable 148 passes off one side of drum 144, around pulley 152, is then attached to the front scoop 120 as at 154, reverses its direction around roller 156 and comes back to the rear of the machine. Said cable 148 then extends around roller 158 and proceeds to the other corner of the lifter frame around roller 160 and extends frontwardly and is attached as at 162 to the scoop. From here is passes around the front roller 164, then reverses itself and comes back to the rear of the lifter frame to roller 166 and back onto the cable drum 144.

Cable 150 passes off drum 146 around roller 168, reverses itself around roller 170, attaches to the rear scoop 120 as at 172, passes around roller 174 and over to the other side of the lifter frame. From there is extends around roller 176, frontwardly to and around roller 178, attaches to the rear scoop 120 as at 180 and finally back to the drum 146 around roller 182.

Each of the scoops 120 is driven forward or backward according to the control means just described. When a load, for example an automobile, is to be picked up, scoops 120 are driven toward each other and independently engage the outboard face of the treads of the front and rear tires 184 of the automobile wheel indicated in FIGURE 6. When scoops 120 engage the load with sufficient pressure a limit switch (not shown) operates to stop the scoop drive motor 140. Since the drive gears 142 are self-locking, the load is held securely between the scoops 120 and may then be lifted up through the main frame by means of the lifter frame and its hoisting mechanism.

Differential drive for load engaging mechanisms

The differential drive means generally shown by the number 141 as has been described has the cable drums 144 and 146 on each side thereof. Drum 144 is mounted on shaft 192 and the drum 146 is keyed to shaft 190. The drive has a housing 194 and has extending therein from the motor 140 the drive shaft 196. Drive shaft 196 is provided on the inside of the housing with a worm 198 which drives worm gear 200. The inner ends of the shafts 190 and 192 are provided with sun gears 202 and 204, respectively. The sun gears 202 and 204, as can be seen from FIGURE 11, are spaced apart and thus do not directly engage each other. The worm gear 200 has side plates 206 and 208 to which are attached by virtue of stub shafts planet gears 210, 212, 214, and 216. Thus, with the planet gears mounted on the inside of the hollow worm gear 200 it can be seen that the planet gears will be driven with the worm gear and thus caused to revolve around the sun gears 202 and 204 and their shafts 190 and 192. As worm gear 200 is caused to rotate by worm 198, and the cable drums being free to turn, the entire mechanism will turn without any of the parts rotating with respect to each other. However, should one of the scoops engage first, its sun gear will stop. However, the worm gear 200 will continue to rotate as will the planet gears. At this point the planets and the sun begin to turn with respect to each other. As soon as one sun gear stops, its planets will drive the other planets so that the motion of the planets in turn is transferred to the other sun gear which is still capable of rotation to drive it in the same direction. In this way the scoops do not have to engage the load simultaneously. In this way one scoop is permitted to stop while the other continues its inward movement until it also engages. With both scoops engaged, the motor becomes overloaded and a limit switch will cut off the motor. Hence, the entire gearing mechanism becomes locked and the scoops are prevented from retracting until the direction of the motor is reversed to reverse the drive gear cable drums to back the scoops away from the load.

Other features

In handling certain types of cargo or materials or when parking automobiles it becomes highly desirable to prevent substances on the load from falling onto loads over which it is being passed. A particularly good example of this is an automobile, since it will frequently be dripping oil, water, grease, mud and other undesirable substances, thus damaging or befouling them as the lifter transporter carries its load over the tops of the other objects. As a safety measure and in order to prevent unsafe or undesirable conditions, a lifter transporter is equipped with a safety curtain generally shown by the number 220. Curtain 220 may be individually power driven or operated by the action of the lifting frame as it travels vertically up and down within the main frame. One form of this curtain is shown in FIGURE 8 in which the curtain or shield is made of suitable material fastened to one side of the main frame 10 and generally extends downwardly or vertically when the lifter frame 70 is in its lowered position. Cables such as 222 are connected to each of the lower corners of the curtain as at 224. Cable 222 passes around a pulley 226 mounted on the outside edge of the lifter frame 70. The cable 222 extends around under the lifter frame and around another pulley 228 on the other side of said lifter frame. Cable 222 then passes upwardly to a retracting mechanism secured to the underside of a top longitudinal member of the main frame. Cable 222 then passes upwardly to a drum 230 which acts as a reel for the curtain cable 222. The reel or drum 230 is mounted on a shaft 232 which in turn is mounted on the main frame by an appropriate bearing structure means (not shown). A torsion spring 234 is mounted within the hollow shaft 232 which in effect serves as a guide and support for the spring. One end of spring 234 is attached to the main frame 10 as at 236 and the opposite end is fastened to the hollow shaft 232 or to worm and worm gear arrangement 238.

The worm gear mechanism obviously prevents the cable 222 from unwinding and functions to permit manual adjustment of the tension on spring 234. When the spring 234 is wound to its desirable torsional force curtain 220 will be tensioned cable 222. The force in the spring will tend to wind the cable 222 onto reel 230 as the lifter frame is hoisted. When said lifter frame is fully hoisted curtain 220 will then be stretched across the underside of the lifter frame beneath the load, thus preventing foreign material from dropping onto other cars or objects. When the lifter frame is lowered, the curtain 220 resumes its vertical position at one side of the main frame and any foreign material received thereon will fall to the ground.

*Operation*

The controls for the several motions provided in this invention may in their more simple form be operated manually by an operator riding on the machine or a programing device may be incorporated for guiding of the machine through its proper sequence of operation. Thus, the machine may be operated remotely or by having an independent power source such as an internal combustion engine mounted thereon. An operator may ride on the vehicle and manually direct the several motions provided. In the latter case the operator may steer the vehicle independently of any fixed trackage over roadways or negotiable terrain because the traction assemblies are all steerable in any direction. If it is desired to operate the lifter transport vehicle by electricity, then power cables may be run to the machine in a number of ways, any one of which is well known by those skilled in the art.

It will be appreciated that the scoops could be driven as shown or that each scoop structure could be driven by its own motor and gear unit. The important feature is the structure of the scoops with relation to the lifter frame, so that the drive means becomes a matter of consideration only insofar as differential movement is required.

The foregoing is considered as illustrative only of the principle of this invention. Numerous modifications and changes will readily occur to those skilled in the art, and hence it is not desired to limit the invention to the precise construction and operation shown and described. Accordingly all suitable modifications and equivalents may be resorted to, falling within the scope of the invention.

What is claimed is:

1. A mobile lifting and transporting vehicle for automobiles and other objects, comprising: (a) a generally rectangular main frame means having spaced-apart longitudinal frame members and cross frame members connecting the ends of said longitudinal members so that said main frame means defines unobstructued space between said longitudinal and cross frame members; (b) generally vertically disposed leg means connected to and supporting each of the four corners of said main frame means, each of said legs having power driven, turnable traction wheel means attached to the lower end thereof; (c) a generally horizontally disposed and vertically movable generally rectangular lifter frame means disposed so that each corner thereof is located near one of said leg means; (d) a hoisting mechanism for said lifter frame means including a drive means located on said main frame means and cable means extending from said lifter frame means to said main frame and to said drive means for raising and lowering said lifter frame means; and (e) a pair of load-engaging means disposed substantially parallel to each other and movably mounted on said lifter frame means, said load-engaging means extending across said lifter frame between opposed frame members and being movable toward and away from each other to engage with a disengage from a load, said load-engaging means also having power means and a differential drive means for moving said load-engaging means.

2. A mobile lifting and transporting vehicle for automobiles and other objects, comprising: (a) a generally rectangular main frame means having spaced-apart longitudinal frame members and cross frame members connecting the ends of said longitudinal members so that said main frame means defines unobstructed space between said longitudinal and cross frame members; (b) generally vertically disposed leg means connected to and supporting each of the four corners of said main frame means, each of said legs having power driven and turnable traction wheel means attached to the lower end thereof; (c) a generally horizontally disposed and vertically movable, generally rectangular lifter frame means disposed so that each corner thereof is located near one of said leg means; (d) a hoisting mechanism for said lifter frame means including a drive means located on said main frame means and cable means extending from said lifter frame means to said main frame and to said drive means for raising and lowering said lifter frame means; and (e) a pair of load-engaging means disposed substantially parallel to each other and movably mounted on and extending across said lifter frame between opposed frame members and being movable toward and away from each other to engage and disengage from a load, said load-engaging means being supported in said opposed frame members and also having power means and a differential drive means for moving said load-engaging means.

3. A mobile lifting and transporting vehicle for automobiles and other objects, comprising: (a) a generally rectangular main frame means having spaced-apart longitudinal frame members and cross frame members connecting the ends of said longitudinal members so that said main frame means defines unobstructed space between said longitudinal and cross frame members; (b) generally vertically disposed leg means connected to and supporting each of the four corners of said main frame means, each of said legs having power driven and turnable traction wheel means attached to the lower end thereof; (c) a generally horizontally disposed and vertically movable, generally rectangular lifter frame means disposed so that each corner thereof is located near one of said leg means; (d) a hoisting mechanism for said lifter frame means including a drive means located on said main frame means and first cable means extending from said lifter frame means to said main frame and to said drive means for raising and lowering said lifter frame means; and (e) a pair of load-engaging means disposed substantially parallel to each other and movably mounted on the extending across said lifter frame between opposed frame members and being movable toward and away from each other to engage and disengage from a load, each of said load-engaging means, including a load-holding member, each of which has at the ends thereof roller-supporting means supported on said opposed frame members, said load-engaging means also having power means and a differential drive means for moving said load-engaging means.

4. A mobile lifting and transporting vehicle for automobiles and other objects, comprising: a generally rectangular main frame means having spaced-apart longitudinal frame members and cross frame members connecting the ends of said longitudinal members so that said main frame means defines unobstructed space between said longitudinal and cross frame members; (b) generally vertically disposed leg means connected to and supporting each of the four corners of said main frame means, each of said legs having power driven and turnable traction wheel means attached to the lower end thereof, said traction wheels being capable of synchronized turning; (c) a generally horizontally disposed and vertically movable generally rectangular lifter frame means disposed so that each corner thereof is located near one of said leg means; (d) a hoisting mechanism for said lifter frame means including a drive means located on said main frame means and a cable means extending from said lifter frame means to said main frame and to said drive means for raising and lowering said lifter frame means; and (e) a pair of load-engaging means disposed substantially parallel to each other movably mounted on and extending across said lifter frame between opposed frame members and being movable toward and away from each other to engage and disengage from a load, each of said load-engaging means including an elongated load-holding member supported by roller means attached to its ends, said roller means being movably supported in said opposed frame members, and said load-engaging means having a power drive means and a differential drive means driven by said power means and also having second cable means operatively connected to said differential drive means and to said pair of load-engaging means for moving said pair of load-engaging means to and away from a load.

5. A lifting frame and load-engaging mechanism for a mobile load-lifting and transporting vehicle having an elevated main frame and depending supporting legs with traction wheels thereon, comprising: (a) a generally rectangular lifter frame having spaced-apart, generally parallel, longitudinal frame members with inwardly extending supporting flange means and cross frame members connecting the ends of said longitudinal frame members, said lifter frame being located under and connected to said main frame by hoisting means for raising and lowering said lifter frame; (b) a pair of load-engaging means extending between and roller-supported on said flange means on said longitudinal frame members, each of said load-engaging means including a load-holding means having end plate means at each end thereof carrying rollers for rolling contact support on said flange means, and (c) a power drive means and a differential drive means driven by said power drive means located on said lifter frame, said differential drive means having cable means operatively connected thereto with said second cable means also attached to each end of each of said load-engaging means for moving said pair of load-engaging means toward and away from each other to engage with and disengage from a load.

6. A lifting frame and load-engaging mechanism for a mobile load lifting and transporting vehicle having an elevated main frame and depending supporting legs with traction wheels thereon, comprising: (a) a generally rectangular lifter frame having spaced-apart, generally parallel, longitudinal frame members with inwardly extending supporting flange means and cross frame members connecting the ends of said longitudinal frame members, said lifter frame being located under and connected to said main frame by hoisting means for raising and lowering said lifter frame, said longitudinal frame members having rack gear means on the flange means thereof; (b) a pair of load-engaging means extending between and roller supported on said longitudinal frame members, each of said load-engaging means including a load-holding means having gear means at each end thereof engaging said rack gear means, and (c) a power drive means and a differential drive means driven by said power drive means located on said lifter frame, said differential drive means having cable means operatively connected thereto with said second cable means also attached to each end of each of said load-engaging means for moving said pair of load-engaging means toward and away from each other to engage with and disengage from a load.

7. A lifting frame and load-engaging mechanism for a mobile load-lifting and transporting vehicle having an elevated main frame and depending supporting legs with traction wheels thereon, comprising: (a) a generally rectangular lifter frame having spaced-apart, generally parallel, longitudinal frame members with inwardly extending supporting flange means and cross frame members connecting the ends of said longitudinal frame members, said lifter frame being located under and connected to said main frame by hoisting means for raising and lowering said lifter frame, said longitudinal frame members having rail means and rack gear means on the flange means thereof; (b) a pair of load-engaging means extending between said longitudinal frame members, each of said load-engaging means including a load-holding means having end plate means at each end thereof carrying rollers for rolling contact support on said rail means and gear means at each end thereof engaging said rack gear means; and (c) a power drive means and a differential drive means driven by said power drive means located on said lifter frame, said differential drive means having cable means operatively connected thereto with said cable means also attached to each end of each of said load-engaging means for moving said pair of load-engaging means toward and away from each other to engage with and disengage from a load.

8. The lifter frame and load-engaging mechanism according to the structure of claim 7 and in which said rail means are located between said end plate means and said rack gear means.

9. A mobile lifting and transporting vehicle for automobiles and other objects, comprising: (a) a generally rectangular main frame means having spaced-apart longitudinal frame members and cross frame members connecting the ends of said longitudinal members so that said main frame means defines unobstructed space between said longitudinal and cross frame members; (b) generally vertically disposed leg means connected to and supporting each of the four corners of said main frame means, each of said legs having power driven and turnable traction wheel means attached to the lower end thereof, said traction wheels being capable of synchronized turning; (c) a generally horizontally disposed and vertically movable generally rectangular lifter frame means disposed so that each corner thereof is located in close proximity to one of said leg means; (d) a hoisting mechanism for said lifter frame means including a drive means located on said main frame means and a hoisting means interconnecting said lifter frame means with said main frame and also connected to said drive means for raising and lowering said lifter frame means; and (e) a pair of load-engaging means disposed substantially parallel to each other and movably mounted on and extending across said lifter frame between opposed frame members and being movable toward and away from each other to engage and disengage from a load, each of said load-engaging means including an elongated load-holding member supported by roller means attached to its ends, said roller means being movably supported in said opposed frame members, and said load-engaging means having power means and a drive means driven by said power means.

10. The mobile lifting and transporting vehicle according to the structure of claim 1 and in which said main frame includes a curtain means attached to one side thereof and which has resilient retracting means on the other side, said curtain means being interconnected to said retracting means by cable means extending under said lifter frame so that said curtain means extends downwardly on one side of said main frame when said lifter frame is in its lowered position and which extends under said lifter frame when said lifter frame is in raised position.

11. A mobile lifting and transporting vehicle for automobiles and other objects, comprising: (a) a generally rectangular, horizontal main frame means having generally vertically depending leg means connected to and supporting each of the four corners of said main frame, (b) a generally horizontally disposed, rectangular lifter frame located under said main frame and within the confines of said leg means, said lifter frame being connected to said main frame by raising and lowering means and including load-engaging means for movement toward and away from each other to engage and disengage from a load; and (c) a curtain means hanging from one side of said main frame and having cable means attached to the lower edge thereof and extending under said lifter frame to the other side of said main frame, said cable means being attached to resilient retracting means secured to said main frame.

12. A mobile lifting and transporting vehicle for automobiles and other objects, comprising: (a) a generally rectangular, open frame means; (b) generally vertically disposed leg means connected to and supporting each of the four corners of said main frame means, said legs having turnable traction wheel means attached to the lower end thereof; (c) a generally horizontally disposed and vertically movable rectangular open lifter frame means disposed so that each corner thereof is located near one of said leg means; (d) a hoisting mechanism for said lifter frame means including a hoisting drive means located on said main frame means, said lifter frame means being interconnected with said main frame means and to said drive means for raising and lowering said lifter frame means; (e) a pair of load engaging means disposed substantially parallel to each other and movably mounted on and extending across said lifter frame means between opposed frame members and being movable toward and away from each other to engage with and disengage from a load, each of said load engaging means including: a shaft rotatably mounted on rail rollers supported on said opposed frame members, a scoop means rotatably affixed to said shaft and having coaxially aligned intermediate support rollers at each end thereof; and (f) rail means on each of said opposed frame members for supporting said rail rollers and including a support roller opening at a predetermined distance from each end of each of said rail means so that said scoops pivot about said rail rollers and hang generally vertically when said load-engaging means are in the extreme out position and so that said scoops are supported by both rail rollers and said support rollers on said rail means to engage a load when said lifter frame is lowered and said load engaging means is moved inwardly toward said load.

13. A mobile lifting and transporting vehicle for automobiles and other objects, comprising: (a) a generally rectangular, open frame means; (b) generally vertically disposed leg means connected to and supporting each of the four corners of said main frame means, said legs having turnable traction wheel means attached to the lower end thereof; (c) a generally horizontally disposed and vertically movable rectangular open lifter frame means disposed so that each corner thereof is located near one of said leg means; (d) a hoisting mechanism for said lifter frame means including a hoisting drive means located on said main frame means, said lifter frame means being interconnected with said main frame means and to said drive means for raising and lowering said lifter frame means; (e) a pair of load engaging means disposed substantially parallel to each other and movably mounted on and extending across said lifter frame means between opposed frame members and being movable toward and away from each other to engage with and disengage from a load, each of said load engaging means including: a shaft rotatably mounted on rail rollers supported on said opposed frame members, a scoop means rotatably affixed to said shaft and having intermediate support rollers at each end thereof; and (f) rail means on each of said opposed frame members for supporting said rail rollers and including a support roller opening near each corner of said lift frame at a predetermined distance from each end of said rail means so that said scoops pivot about said support rollers and hang generally vertically when said load engaging means are in the extreme out position and so that said scoops are supported by said support rollers on said rail means to engage a load when said lifter frame is lowered and said load engaging means is moved inwardly toward said load.

14. A mobile lifting and transporting vehicle for automobiles and other objects, comprising: (a) a generally rectangular, open frame means; (b) generally vertically disposed leg means connected to and supporting each of the four corners of said main frame means, said legs having turnable traction wheel means attached to the lower end thereof; (c) a generally horizontally disposed and vertically movable rectangular open lifter frame means disposed so that each corner thereof is located near one of said leg means; (d) a hoisting mechanism for said lifter frame including a hoisting drive means located on said main frame means, said lifter frame means being interconnected with said main frame means and to said drive means for raising and lowering said lifter frame means; (e) a pair of load engaging means disposed substantially parallel to each other and movably mounted on and extending across said lifter frame means between opposed frame members and being movable toward and away from each other to engage with and disengage from a load, each of said load engaging means including: a shaft rotatably mounted on main rollers supported on said opposed frame members, a scoop plate with end plates pivotally affixed to said shaft, said end plates having intermediate support rollers; and (f) rail means on each of said opposed frame members for supporting said rail rollers and including a support roller opening at a predetermined distance from each end of said rail means to receive said support rollers so that said scoops pivot about said main rollers and hang generally vertically when said load-engaging means are in the extreme out position and so that said scoops are supported by both rail rollers and said support rollers on said rail means to engage a load when said lifter frame is lowered and said load engaging means is moved inwardly toward said load.

15. A mobile lifting and transporting vehicle for automobiles and other objects, comprising: (a) a generally rectangular, open frame means; (b) generally vertically disposed leg means connected to and supporting each of the four corners of said main frame means, said legs having thereof; (c) a generally horizontally disposed and vertically movable rectangular open lifter frame means disposed so that each corner thereof is located near one of said leg means, said lifter frame having opposed frame members carrying rack means and rail means inwardly of said rack means; (d) a hoisting mechanism for said lifter frame means including a hoisting drive means located on said main frame means, said lifter frame means being interconnected with said main frame means and to said drive means for raising and lowering said lifter frame means; (e) a pair of load engaging means disposed substantially parallel to each other and movably mounted on and extending across said lifter frame means between said opposed frame members and being movable toward and away from each other to engage with and disengage from a load, each of said load engaging means including: a shaft rotatably mounted on rail rollers supported on said rail means and on gear wheels supported on said rack means, a scoop means pivotally affixed to said shaft and having intermediate support rollers at each end thereof; and (f) a support roller opening at a predetermined distance from each end of said rail means to receive said support rollers so that said scoops pivot about said rail rollers and said gear wheels and hang generally vertically when said load-engaging means are in the extreme out position and so that said scoops are supported by both said rail rollers and said support rollers on said rail means to engage a load when said load engaging means are moved inwardly toward said load.

16. A mobile lifting and transporting vehicle for automobiles and other objects, comprising: (a) a generally rectangular, open frame means; (b) generally vertically disposed leg means connected to and supporting each of the four corners of said main frame means, said legs having turnable traction wheel means attached to the lower end thereof; (c) a generally horizontally disposed and vertically movable rectangular open lifter frame means disposed so that each corner thereof is located near one of said leg means, said lifter frame having opposed frame members carrying rack means and rail means inwardly of said rack means; (d) a hoisting mechanism for said lifter frame means including a hoisting drive means located on said main frame means, said lifter frame means being interconnected with said main frame means and to said drive means for raising and lowering said lifter frame means; (e) a pair of load engaging means disposed substantially parallel to each other and movably mounted on and extending across said lifter frame means between said opposed frame members and being movable toward and away from each other to engage with and disengage from a load, each of said load engaging means including: a shaft rotatably mounted on rail rollers supported on said rail means and on gear wheels supported on said rack means opposed frame members, a scoop means pivotally affixed to said shaft and having end plates with intermediate coaxially aligned support rollers thereon spaced from said rail rollers; and (f) a support roller opening at a predetermined distance from each end of said rail means so that said scoops pivot about said rail rollers and said gear wheels and hang generally vertically when said load engaging means are in the extreme out posiiton and so that said scoops are supported by said gear wheels, said rail rollers and said support rollers on said rail means to engage a load when said load engaging means is moved inwardly toward said load.

References Cited by the Examiner

UNITED STATES PATENTS

| | | | |
|---|---|---|---|
| Re. 17,918 | 1/1931 | Dinkelberg | 214—333 |
| 1,859,245 | 5/1932 | Remington | 74—714 |
| 1,987,674 | 1/1935 | Ford | 74—714 |
| 2,233,055 | 2/1941 | Kennedy | 187—8.59 |
| 2,242,891 | 5/1941 | Light | 187—8.59 |
| 2,904,200 | 9/1959 | Diehl | 214—392 |
| 3,066,814 | 12/1962 | Christiansen | 214—392 |
| 3,117,652 | 1/1964 | Wallace | 187—8.59 |

FOREIGN PATENTS 1,160,793  8/1958  France.

HUGO O. SCHULZ, *Primary Examiner.*

GERALD M. FORLENZA, *Examiner.*